United States Patent
Sato

(10) Patent No.: US 8,830,501 B2
(45) Date of Patent: Sep. 9, 2014

(54) PROCESS FLOW EXECUTION APPARATUS, CONTROL METHOD THEREOF, AND STORAGE MEDIUM STORING CONTROL PROGRAM THEREFOR FOR DETERMINING THE VERSION OF A PROCESS FLOW APPLICATION

(75) Inventor: Tetsuya Sato, Yokohama (JP)

(73) Assignee: Canon Kabushiki Kaisha (JP)

( * ) Notice: Subject to any disclaimer, the term of this patent is extended or adjusted under 35 U.S.C. 154(b) by 860 days.

(21) Appl. No.: 12/421,698

(22) Filed: Apr. 10, 2009

(65) Prior Publication Data

US 2009/0259880 A1 Oct. 15, 2009

(30) Foreign Application Priority Data

Apr. 11, 2008 (JP) ................................. 2008-103786

(51) Int. Cl.
*G06F 3/12* (2006.01)
*H04N 1/00* (2006.01)

(52) U.S. Cl.
CPC ....... *H04N 1/00344* (2013.01); *H04N 1/00954* (2013.01); *G06F 3/1294* (2013.01); *H04N 1/0035* (2013.01); *G06F 3/1296* (2013.01); *H04N 1/00912* (2013.01); *H04N 1/00957* (2013.01); *H04N 1/00973* (2013.01)
USPC .......................... 358/1.15; 358/1.13; 358/1.16

(58) Field of Classification Search
USPC .................................................. 358/1.1–1.16
See application file for complete search history.

(56) References Cited

U.S. PATENT DOCUMENTS

| | | | |
|---|---|---|---|
| 6,607,314 B1 * | 8/2003 | McCannon et al. | 400/62 |
| 6,775,025 B1 * | 8/2004 | Robinson et al. | 358/1.15 |
| 6,975,417 B1 * | 12/2005 | Hilpl et al. | 358/1.15 |
| 7,595,902 B2 * | 9/2009 | Yamaguchi et al. | 358/1.15 |
| 2005/0030574 A1 * | 2/2005 | McVey et al. | 358/1.14 |
| 2006/0215221 A1 * | 9/2006 | Suzuki et al. | 358/1.15 |
| 2008/0180741 A1 * | 7/2008 | Miyata | 358/1.15 |

FOREIGN PATENT DOCUMENTS

| | | |
|---|---|---|
| JP | 10-63511 A | 3/1998 |
| JP | 2005-006294 A | 1/2005 |
| JP | 2007-282136 A | 10/2007 |

OTHER PUBLICATIONS

JP Office Action issued Jul. 17, 2012 for corresponding JP2008-103786.

* cited by examiner

*Primary Examiner* — Benny Q Tieu
*Assistant Examiner* — Michael Y Tzeng
(74) *Attorney, Agent, or Firm* — Rossi, Kimms & McDowell LLP

(57) ABSTRACT

A process flow execution apparatus capable of notifying a user of a task or a setting that is not supported in an application of a version lower than a version set in a process flow that describes process contents of a plurality of tasks. A process flow application handling the process flow is installed in the apparatus that can communicate with another apparatus capable of handling the process flow application, via a network. An acceptance unit accepts an instruction to execute the plurality of tasks based on the process flow. A control unit controls to display a warning screen on a display unit if a version of a process flow application that generates the process flow for which the acceptance unit has accepted the execution instruction is higher than a version of the process flow application installed in the process flow execution apparatus.

12 Claims, 15 Drawing Sheets

FIG.4

| ID 401 | PROCESS FLOW NAME 402 | PUBLISHED RANGE 403 | VERSION 404 | INQUIRY DESTINATION 405 | TASK 406 | PROCESS FLOW DEFINITION 407 |
|---|---|---|---|---|---|---|
| 1 | TRANSMIT CONFIDENTIAL DOCUMENT | UserA | 3.0 | 33.33. ... 44.44. ... | Scan, Box, Encrypt, Send | ... |
| 2 | DISTRIBUTE MINUTES | UserA | 2.0 | 22.22. ... | Scan, Send | ... |
| 3 | PRINT FILE | UserB | 1.0 | 11.11. ... | Box, Print | ... |
| 4 | APPLY FOR BUSINESS TRIP | COMMON | 1.0 | 11.11. ... | Box, Send | ... |
| ... | | | | | | |

```
PROCESS FLOW DEFINITION FILE
  <?xml version="1.0"encoding="utf-8"?>
  <Taskflow id="1"caption="TRANSMIT CONFIDENTIAL DOCUMENT"
              flowVersion="3.0""destination="33.33.…">
    <Task type="Scan">  ~501
      <Setting>....</Setting>                    550
    </Task>
    <Task type="BOx">  ~502
      <Doc id="doc101">  ~503
      <Setting>....</Setting>
    </Task>
    <Task type="Encrypt">  ~504
      <Doc id="doc101">
      <Doc id="scan001">
    </Task>
    <Task type="Send">  ~505
      <Setting type="Addr">  ~506
      Customer@…
      </Setting>
      <Setting>....</Setting>
    </Task>
  </Taskflow>
```

```
Taskflow TAG          552
  <Taskflow id="1"caption="TRANSMIT CONFIDENTIAL DOCUMENT"
              flowVersion="3.0
       551            destination="33.33.…,44.44.…">
                553
                                                        554
```

PROCESS FLOW INQUIRY DEFINITION FILE
  <?xml version="1.0"encoding="utf-8"?>
  <UnkownFlow destination="11.11.···"> ~801
    <UnkownTask type="Encrypt"caption="">
      <UnkownSetting type=···>
      </UnkownSetting>       803  802
    </TUnkownTask>         804
    ...
  </UnkownFlow>

FOLLOWING FUNCTION UNAVAILABLE
IN THIS VERSION HAS BEEN SET.

☑ ENCRYPTION —1101

IF YOU CANCEL ABOVE SETTING, UNCHECK ABOVE BOX.

| CONTINUE | CANCEL |

PROCESS FLOW EXECUTION APPARATUS, CONTROL METHOD THEREOF, AND STORAGE MEDIUM STORING CONTROL PROGRAM THEREFOR FOR DETERMINING THE VERSION OF A PROCESS FLOW APPLICATION

BACKGROUND OF THE INVENTION

1. Field of the Invention

The present invention relates to a process flow execution apparatus that executes a plurality of tasks as a process flow, a control method therefor, and a storage medium storing a control program therefor.

2. Description of the Related Art

There has been provided an application in which a plurality of tasks included in an image forming apparatus such as a copying machine are combined and registered as a flow of a series of processes, and a user can invoke the flow to smoothly execute a combination of frequently used processes.

A task (or also referred to as "job") denotes, for example, a process that can be realized by an individual function in an image forming apparatus having multiple functions, or a process that can be realized by an application executed by an information processing apparatus or the like.

For example, input/output tasks of the image forming apparatus (print processing apparatus) include scan of a document, print of document data, transmission (an email, a facsimile, a file and the like), storing data into a disk (storing data into a hard disk inside or outside the above described print processing apparatus) and the like. Editing tasks include combining of documents in which a plurality of pieces of document data are combined as one piece of document data, deletion of a page in the document data, and the like.

A combination of a series of tasks that is generated in order to concatenate the plurality of tasks as described above and to process the tasks in a time series manner is referred to as "process flow". There are various combinations, including a case where a result of one task is used as an input for executing another task.

There is an image forming apparatus in which an application handling the above described process flow has been installed. Such an image forming apparatus executes the process flow when the user depresses a button for executing the process flow.

Some of such image forming apparatuses have a function of transmitting a generated process flow to another image forming apparatus. The image forming apparatus that has received the process flow displays the process flow as a button on a UI (User Interface). Similarly, the image forming apparatus that has received the process flow also executes the process flow when the user depresses the button. Moreover, the image forming apparatus that has received the process flow can also further transmit the process flow to another image forming apparatus.

In the image forming apparatus in which the application handling the process flow as described above has been installed, tasks or task settings that can be analyzed or executed may be different depending on a version of the process flow application.

If an image forming apparatus including an application of a version lower than the application in the image forming apparatus that has transmitted the process flow executes or edits the process flow, there is a problem as follows.

If the transmitted process flow includes a task or a setting thereof that is not supported in the lower application, the task or the setting cannot be analyzed. For example, it is assumed that a process flow with contents of "encrypting and transmitting scanned data" has been generated.

In that case, the process flow application that does not support "encryption" cannot analyze a part of "encrypting". In this case, if the process flow is directly executed, a process of "transmitting scanned data" is executed.

A technique regarding compatibility between versions as described above is disclosed, for example, in Japanese Laid-Open Patent Publication (Kokai) No. 10-63511. In the technique disclosed in this publication, when a job script is transmitted to another machine, a transmitting machine inquires of a receiving machine about its execution environment.

If the receiving machine has been in an environment in which the job script cannot be executed, a part or all of an application program required for the execution is transmitted along with the job script. The receiving machine extracts the part or all of the application program that has been received, performs function expansion such as version upgrade, and then executes the job script.

However, the above described conventional technique has a problem as follows.

The application installed in the image forming apparatus, such as the process flow application, generally highly depends on a model, and if the transmitting machine and the receiving machine are different in model, it is difficult to transmit the required application program. In that case, it is impossible to notify the user of which task or setting is not executed among tasks or settings that have been set in the process flow. Consequently, even if the user executes the process flow, a result that is not intended by the user may be provided.

SUMMARY OF THE INVENTION

The present invention provides a process flow execution apparatus that can notify a user of a task or a setting that is not supported in an application of a version lower than a version set in a process flow and that can obtain a result intended by the user, a control method therefor, and a storage medium storing a control program therefor.

Accordingly, the present invention provides a process flow execution apparatus in which a process flow application handling a process flow that describes process contents of a plurality of tasks is installed, and that can communicate with another apparatus capable of handling the process flow application, via a network, the process flow execution apparatus comprising an acceptance unit adapted to accept an instruction to execute the plurality of tasks based on the process flow, and a control unit adapted to control to display a warning screen on a display unit if a version of a process flow application that generates the process flow for which the acceptance unit has accepted the execution instruction is higher than a version of the process flow application installed in the process flow execution apparatus.

Accordingly, the present invention provides a process flow execution apparatus in which a process flow application handling a process flow that describes process contents of a plurality of tasks is installed, the process flow execution apparatus comprising an editing unit adapted to edit the process flow, a communication unit adapted to communicate with another apparatus capable of handling the process flow application, via a network, and a display unit adapted to display contents of the process flow, wherein contents described in the process flow include information indicating a version of a process flow application that has edited the process flow, and an identifier that specifies an apparatus that has edited the process flow, the editing unit is adapted to, if the version described in the process flow is lower than a version of the process flow application installed in the process flow execution apparatus, overwrite the process flow with the version of the process flow application and an identifier that specifies the process flow execution apparatus, and the communication unit is adapted to, if the version described in the process flow is higher than the version of the process flow application installed in the process flow execution apparatus, inquire of another apparatus specified by the identifier about process contents of the process flow that cannot be executed in the process flow application included in the process flow execution apparatus, receive a response to the inquiry, from the another apparatus, and display received process contents on the display unit.

Accordingly, the present invention provides a control method for a process flow execution apparatus in which a process flow application handling a process flow that describes process contents of a plurality of tasks is installed, and that can communicate with another apparatus capable of handling the process flow application, via a network, the control method comprising an acceptance step of accepting an instruction to execute the plurality of tasks based on the process flow, and a control step of controlling to display a warning screen on a display unit if a version of a process flow application that generates the process flow for which the execution instruction has been accepted in the acceptance step is higher than a version of the process flow application installed in the process flow execution apparatus.

Accordingly, the present invention provides a control method for a process flow execution apparatus in which a process flow application handling a process flow that describes process contents of a plurality of tasks is installed, and that can communicate with another apparatus capable of handling the process flow application, via a network, the control method comprising an acceptance step of accepting an instruction to execute the plurality of tasks based on the process flow, and a control step of controlling to display a warning screen on a display unit if a version of a process flow application that generates the process flow for which the execution instruction has been accepted in the acceptance step is higher than a version of the process flow application installed in the process flow execution apparatus.

Accordingly, the present invention provides a computer-readable storage medium storing a control program executing a control method for a process flow execution apparatus in which a process flow application handling a process flow that describes process contents of a plurality of tasks is installed, and that can communicate with another apparatus capable of handling the process flow application, via a network, the control method comprising an acceptance step of accepting an instruction to execute the plurality of tasks based on the process flow, and a control step of controlling to display a warning screen on a display unit if a version of a process flow application that generates the process flow for which the execution instruction has been accepted in the acceptance step is higher than a version of the process flow application installed in the process flow execution apparatus.

Accordingly, the present invention provides a computer-readable storage medium storing a control program executing a control method for a process flow execution apparatus in which a process flow application handling a process flow that describes contents of a plurality of tasks is installed, the control method comprising an editing step of editing the process flow, a communication step of communicating with another apparatus capable of handling the process flow application, via a network, and a display step of displaying contents of the process flow on a display unit, wherein contents described in the process flow include information indicating a version of a process flow application that has edited the process flow, and an identifier specifying an apparatus that has edited the process flow, the editing step comprises a step of, if the version described in the process flow is lower than a version of the process flow application installed in the process flow execution apparatus, overwriting the process flow with the version of the process flow application and an identifier that specifies the process flow execution apparatus, and the communication step comprises a step of, if the version described in the process flow is higher than the version of the process flow application installed in the process flow execution apparatus, inquiring of another apparatus specified by the identifier about process contents of the process flow that cannot be executed in the process flow application installed in the process flow execution apparatus, and receiving a response to the inquiry, from the another apparatus, and the display step comprises a step of displaying received process contents on the display unit.

According to the present invention, it is also possible to notify the user of the task or the setting that is not supported in the application of the version lower than the version set in the process flow. Hence, a result of executing the process flow can be prevented from being a result that is not intended by the user.

The features and advantages of the invention will become more apparent from the following detailed description taken in conjunction with the accompanying drawings.

BRIEF DESCRIPTION OF THE DRAWINGS

FIG. 4 shows an example of a process flow management file used in the image forming apparatus of FIG. 2.

FIG. 5A shows a description example of a process flow definition file used in the image forming apparatus of FIG. 2.

FIG. 5B shows a part extracted from tags of FIG. 5A.

FIG. 6 shows an example of an operation screen that is displayed on an operation unit in FIG. 2 when a user A in the process flow management file of FIG. 4 has logged in.

FIG. 8 shows a description example of a process flow inquiry definition file used in the image forming apparatus of FIG. 2.

FIG. 11 shows an example of the operation screen (warning screen) that is displayed on the operation unit of FIG. 2 if there has been the task, the setting thereof or the like that has not been able to be analyzed when the GENERATE/EDIT button in FIG. 6 has been depressed.

DESCRIPTION OF THE PREFERRED EMBODIMENTS

Hereinafter, embodiments of the present invention will be described in detail with reference to the drawings.

Figure 1:
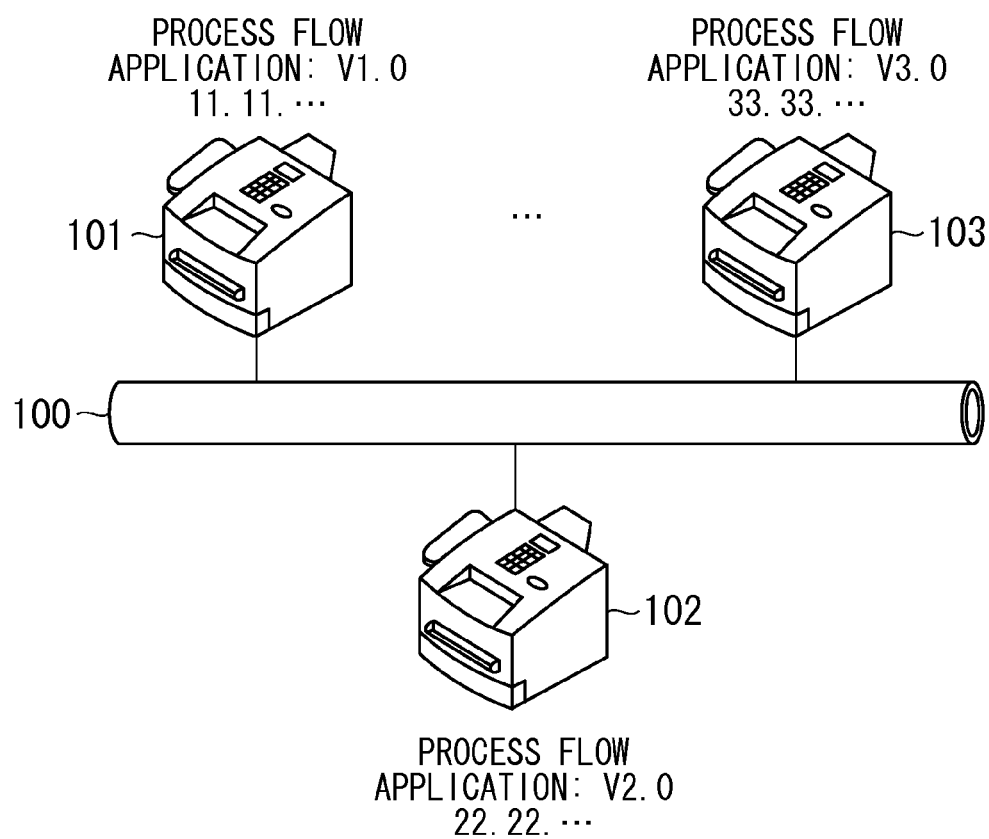
FIG. 1 is a configuration view of an image forming system in which image forming apparatuses as process flow execution apparatuses according to an embodiment of the present invention have been connected to one another via a network.

FIG. 1 is a configuration view of an image forming system in which image forming apparatuses as process flow execution apparatuses according to an embodiment of the present invention have been connected to one another via a network.

Image forming apparatuses 101, 102 and 103 as the process flow execution apparatuses are multifunctional image forming apparatuses that are also referred to as MFPs (Multiple Function Peripherals). The image forming apparatuses 101, 102 and 103 are connected to a LAN 100 and can communicate with one another.

In the image forming apparatus 101, a process flow application of version (Ver) 1.0 has been installed, and its IP address is 11.11. . . . . In the image forming apparatus 102, a process flow application of Ver 2.0 has been installed, and its IP address is 22.22. . . . . In the image forming apparatus 103, a process flow application of Ver 3.0 has been installed, and its IP address is 33.33. . . . . The larger the number of the version is, the higher the version is.

The process flow application is an application that executes a series of image processing tasks (hereinafter, "process flow"). Editing and execution of the process flow in the process flow application will be described later.

Figure 2:
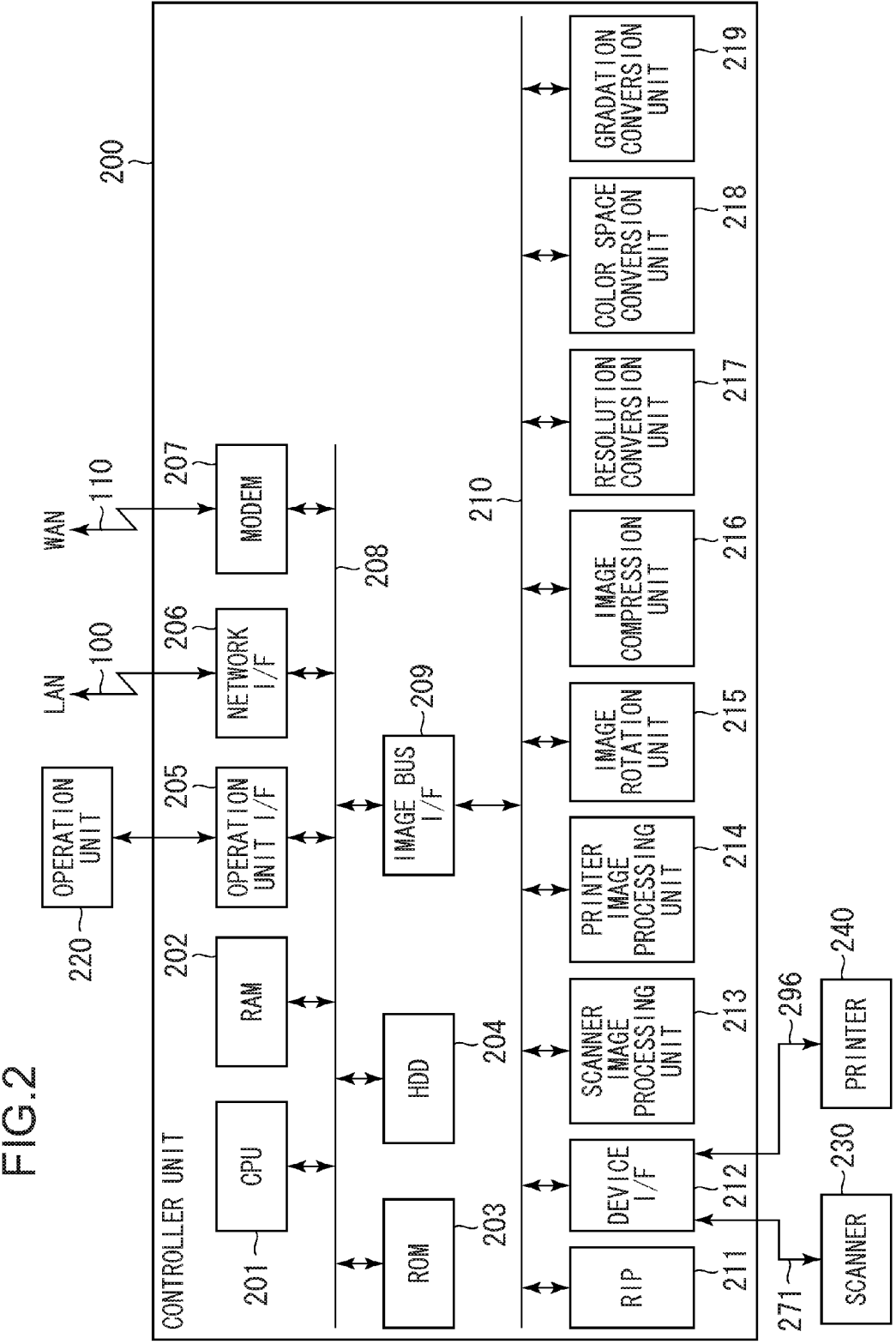
FIG. 2 is a block diagram showing an internal configuration of the image forming apparatus of FIG. 1.

FIG. 2 is a block diagram showing an internal configuration of the image forming apparatus of FIG. 1. In FIG. 2, each of the image forming apparatuses 101, 102 and 103 includes a controller unit 200, an operation unit 220, a scanner 230 and a printer 240.

The controller unit 200 can input and output image information and device information by connecting to the LAN 100 or a public line (WAN) 110.

In the controller unit 200, a CPU 201 is a controller that controls the entire system. A RAM 202 is a system work memory with which the CPU 201 operates, and is also an image memory in which image data is temporarily stored.

A ROM 203 is a boot ROM in which a system boot program has been stored. An HDD 204 is a hard disk drive in which the image data and software modules are stored.

An operation unit I/F 205 is an interface unit with respect to the operation unit 220, and outputs image data to be displayed on the operation unit 220, to the operation unit 220. Moreover, the operation unit I/F 205 accepts an operation instruction from the operation unit 220. A network I/F 206 connects to the LAN 100 to input and output the information. A modem 207 connects to the public line 110 to input and output the image information.

The above described devices are arranged on (connected to) a system bus 208.

An image bus I/F 209 is a bus bridge that connects the system bus 208 to an image bus 210 that transfers the image data at a high speed, and converts a data structure.

The following devices are arranged on the image bus 210.

A raster image processor (RIP) 211 expands a PDL code into a bitmap image. A device I/F 212 connects the scanner 230 and the printer 240 that are image input/output devices, to the controller unit 200.

A scanner image processing unit 213 has a function of correcting, processing and editing input image data. Moreover, the scanner image processing unit 213 has a function of determining whether an inputted image is a color document or a monochrome document, based on a chroma signal of the image, and retaining a result thereof.

A printer image processing unit 214 has a function of correcting, processing and editing output image data. An image rotation unit 215 can rotate the image simultaneously with reading of the image from the scanner 230, in cooperation with the scanner image processing unit 213, and store the rotated image on a memory. Moreover, the image rotation unit 215 can rotate the image in the memory and store the rotated image in the memory. Moreover, the image rotation unit 215 can perform print output of the image in the memory while rotating the image, in cooperation with the printer image processing unit 214.

An image compression unit 216 compresses and expands multi-value image data in a JPEG format, and compresses and expands binary image data in any of JBIG, MMR, MR and MH formats. A resolution conversion unit 217 converts a resolution of the image in the memory and stores the converted image into the memory.

A color space conversion unit 218 converts, for example, a YUV image in the memory into a Lab image with a matrix operation, and stores the converted image into the memory. A gradation conversion unit 219 converts, for example, an 8-bit, 256-gradation image in the memory into a 1-bit, 2-gradation image, with a method such as an error diffusion process, and stores the converted image into the memory.

The image rotation unit 215, the image compression unit 216, the resolution conversion unit 217, the color space conversion unit 218, and the gradation conversion unit 219 can be coupled to one another to be operated together. For example, if the image in the memory is rotated and its resolution is converted, both processes can be performed without involving the memory.

Figure 3:
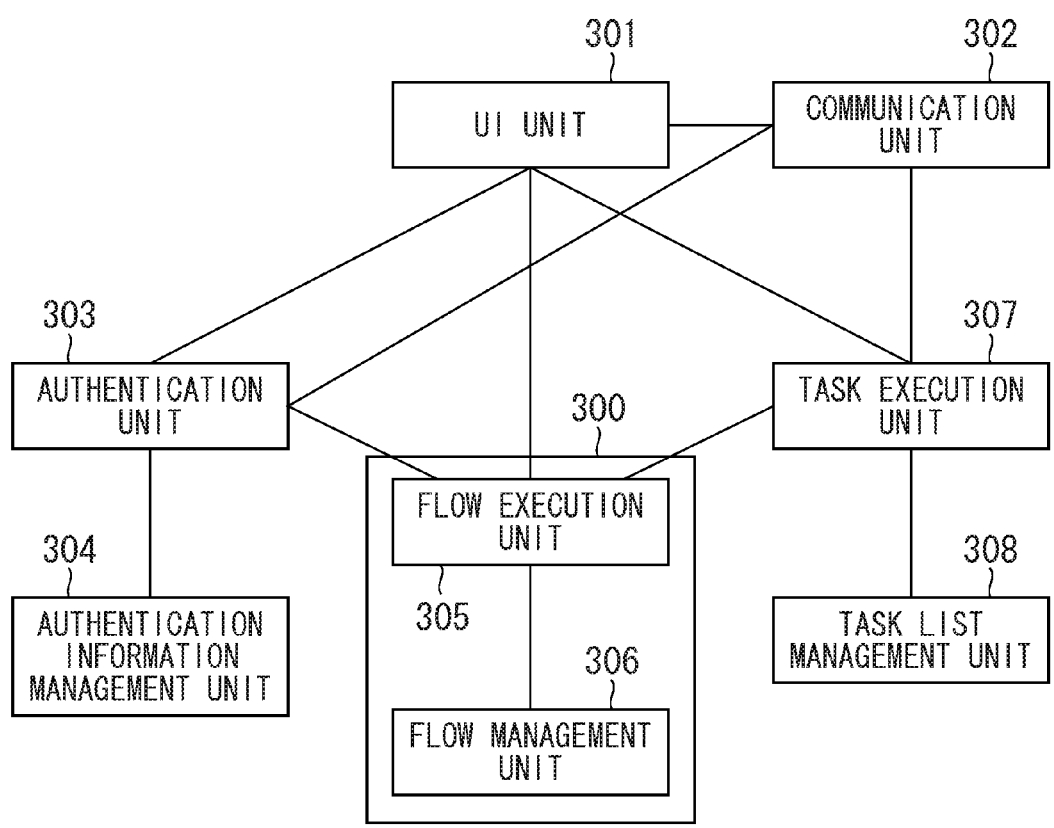
FIG. 3 is a configuration view of software modules related to process flow control executed in the image forming apparatus of FIG. 2.

FIG. 3 is a configuration view of software modules related to process flow control executed in the image forming apparatus of FIG. 2. These software modules are stored in the ROM 203 and the HDD 204, and executed by the CPU 201.

A process flow application 300 consists of a flow execution unit 305 and a flow management unit 306. The process flow application 300 realizes the editing or the execution of the process flow in cooperation with the other software modules of FIG. 3. The flow execution unit 305 and the flow management unit 306 will be described later.

A UI unit 301 is a software module that performs display on the operation unit 220 via the operation unit I/F 205, and processes a user input from the operation unit 220.

The UI unit 301 displays a screen related to the process flow application 300 in accordance with an instruction from the process flow application 300. Moreover, the UI unit 301 sends contents of the user input and the like from the operation unit 220 to the process flow application 300.

The process flow application 300 passes a result of the input contents received from the UI unit 301, to the flow execution unit 305. In the present embodiment, although the UI unit 301 is an external module provided outside the process flow application 300, it may be an internal module provided inside the process flow application 300.

A communication unit 302 is a software module that operates the network I/F 206 or the modem 207 to perform communications (transmission and reception). An authentication unit 303 is a software module that receives user login information accepted by the UI unit 301 through an operation on the operation unit 220 by a user, or user information received from the communication unit 302, performs user authentication, and manages a user session.

An authentication information management unit 304 is a software module that manages user authentication information, and responds to an authentication information inquiry from the authentication unit 303. In the present embodiment, although the authentication information management unit 304 includes the authentication information within its own device, an authentication server (not shown) may be separately provided to manage the authentication information.

The flow execution unit 305 is a software module that analyzes a process flow definition file to be described later. Moreover, the flow execution unit 305 also has a function of dividing the process flow into task settings in units of functions (for example, a scan job setting, a print job setting, a transmission job setting, and the like).

The flow execution unit 305 functions as an editing unit that edits the process flow in which process contents of various image processing tasks have been described, and an analyzing unit that analyzes the process flow.

The flow management unit 306 is a software module to manage a process flow management file that defines which process flow execution button should be displayed on the operation unit 220 in response to a login user.

Moreover, the flow management unit 306 manages the process flow definition file in which settings for executing the process flow have been described. The process flow management file and the process flow definition file will be described later. In the present embodiment, although the description of the process flow is handled as the file, the description of the process flow may be retained in the RAM 202.

The flow management unit 306 functions as a storage unit that can store the process flow and also store an inquiry result.

A task execution unit 307 is a software module that generates a task based on setting information on various tasks and executes the task. A task list management unit 308 is a software module that manages a task that should be executed.

The various tasks are generated in accordance with requests from the UI unit 301, the communication unit 302, and the flow execution unit 305 in the process flow application 300.

For example, if an instruction to copy or scan has been issued by the user at the UI unit 301, each task setting for the copy or the scan is passed from the UI unit 301 to the task execution unit 307. Next, the task setting is registered in the task list management unit 308. The task execution unit 307 executes tasks managed by the task list management unit 308, in the order thereof. A similar process is performed also if a task setting has been passed from another image forming apparatus or another PC via the communication unit 302.

FIG. 4 shows an example of the process flow management file used in the image forming apparatus of FIG. 2.

In the present embodiment, while a process flow management file 400 uses a table format as a schematic view, the process flow management file 400 may be a text file in a CSV (Comma Separated Values) format or an XML (Extensible Markup Language) format.

A column 401 indicates a management ID of the process flow. A column 402 indicates a name of the process flow. A column 403 indicates a target to which an access right to the process flow has been given (published range).

For example, an access right to a process flow with ID:1 has been given to "User A", and is displayed as a button when the user A logs in. A button for a process flow with the published range of "COMMON" is displayed regardless of a login user.

A column 404 indicates the version of a highest process flow application in the image forming apparatuses that have edited the process flow. For example, if one process flow has been newly generated by the application of Ver 1.0, and subsequently, transmitted to the image forming apparatuses in which the applications of Ver 3.0 and Ver 2.0 have been installed, in the order thereof, and edited, "3.0" is entered in the column 404.

A column 405 indicates the IP address of the image forming apparatus in which the process flow application of the highest version in the column 404 has been installed. In the column 405, a plurality of IP addresses can be described. In the present embodiment, the IP address is used as an inquiry destination, which, however, may be anything that can specify the image forming apparatus in which the process flow application of the highest version has been installed, such as an address of a Web Service. A column 406 indicates task contents, and a column 407 indicates a definition of the process flow.

FIGS. 5A and 5B show an example of the process flow definition file used in the image forming apparatus of FIG. 2.

In the present embodiment, although a process flow definition file 500 of FIG. 5A is handled as an XML file, the process flow definition file 500 may have been described in another format. The process flow definition file can be generated by the image forming apparatus in which the process flow application has been installed.

The task included in the process flow is represented as an XML tag, and the order of appearance thereof is the order of the task to be processed. However, in FIG. 5A, detailed description contents related to the task are omitted.

A part corresponding to a tag 550 of FIG. 5A (Task Flow tag) has been extracted to FIG. 5B. Attributes within the tag 550 will be described later.

A tag 501 indicates that a scan task using the scanner 230 is executed to input an image. A tag 502 indicates a task of handling the image data saved in the HDD 204 as an input document.

A tag 503 specifies the image data saved in the HDD 204. A tag 504 indicates that a task of encrypting the document is executed to convert a plurality of pieces of the image data into encrypted data.

A tag 505 indicates that a transmission task is executed to transmit the image data to a transmission destination. A tag 506 indicates an address corresponding to the transmission destination in a setting of the transmission task. A plurality of addresses corresponding to the transmission destinations can be set by adding the tags 506. Moreover, for the transmission task, destinations of email transmission, file transmission such as SMB transmission, facsimile transmission and the like can be set.

An attribute 551 represents the management ID of the process flow. An attribute 552 represents the name of the process flow. An attribute 553 represents the version of the highest process flow application in the process flow applications that have edited this process flow.

An attribute 554 represents the IP address of the image forming apparatus in which the highest process flow application in the process flow applications that have edited the process flow, has been installed. If there are a plurality of image forming apparatuses in which the highest process flow application in the process flow applications that have edited the process flow, has been installed, a plurality of IP addresses are described as inquiry destinations.

The image forming apparatus can analyze the process flow definition file shown in FIG. 5A, sequentially execute a plurality of tasks described in the process flow definition file, and thereby execute the process flow.

It should be noted that although, in the present embodiment, as the attribute 554, the IP address is used to specify the image forming apparatus, another identifier such as a serial number or a MAC address of the apparatus, which can uniquely specify the image forming apparatus, may be used.

Figure 6:
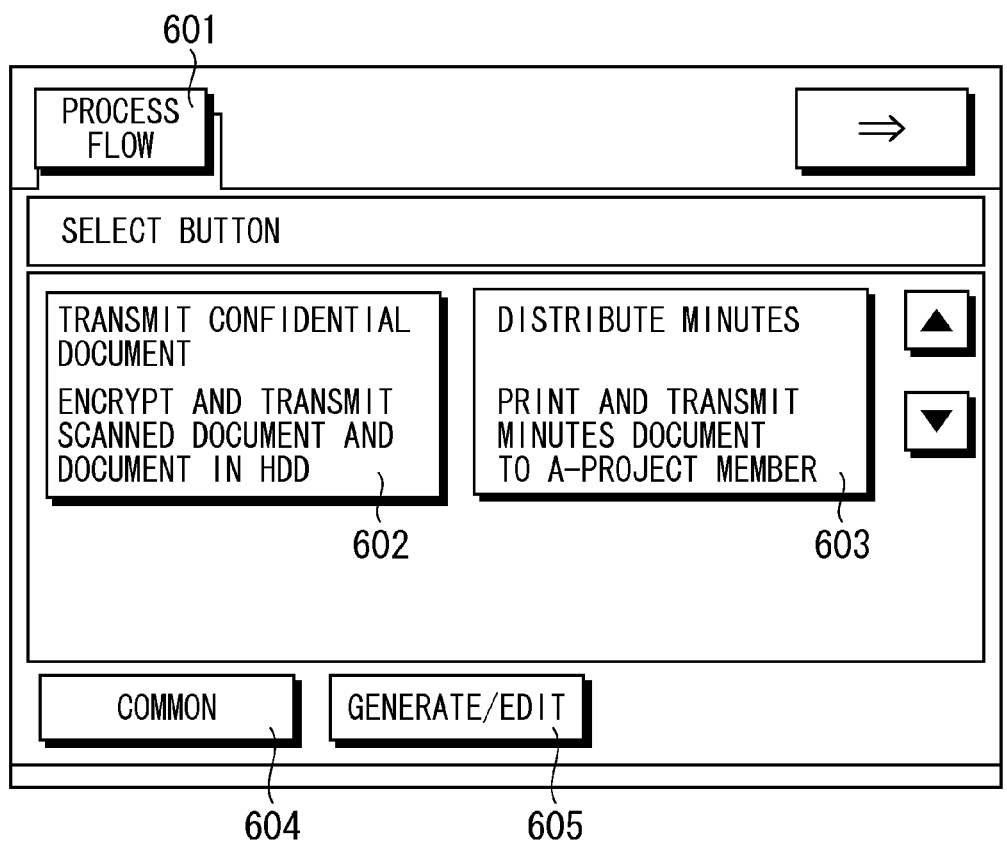

FIG. 6 shows an example of an operation screen that is displayed on the operation unit in FIG. 2 when the user A in the process flow management file of FIG. 4 has logged in the image forming apparatus.

A button 601 is a button for displaying a screen of the process flow application 300 of FIG. 3. Buttons 602 and 603 are buttons for invoking and executing the process flow displayed on the screen of the process flow application 300. One button corresponds to one process flow. When the user A has logged in, the process flow with the published range of "User A" in the column 403 in the process flow management file 400 is displayed as the button.

When a User B has logged in, the process flow with the published range of "User B" in the column 403 is displayed as the button (omitted in the figure).

A button 604 is a button for switching the screen to a common screen that is displayed regardless of the login user. When the button 604 is depressed, the process flow with the published range of "COMMON" in the column 403 in the process flow management file 400 is displayed as the button (omitted in the figure).

A button 605 is adapted for displaying a process flow generation/editing screen. When the button 605 has been depressed in order to edit the process flow, if there has been a task or the like that cannot be analyzed, a process flow inquiry definition file 800 is generated. The process flow inquiry definition file 800 will be described later.

Figure 7:
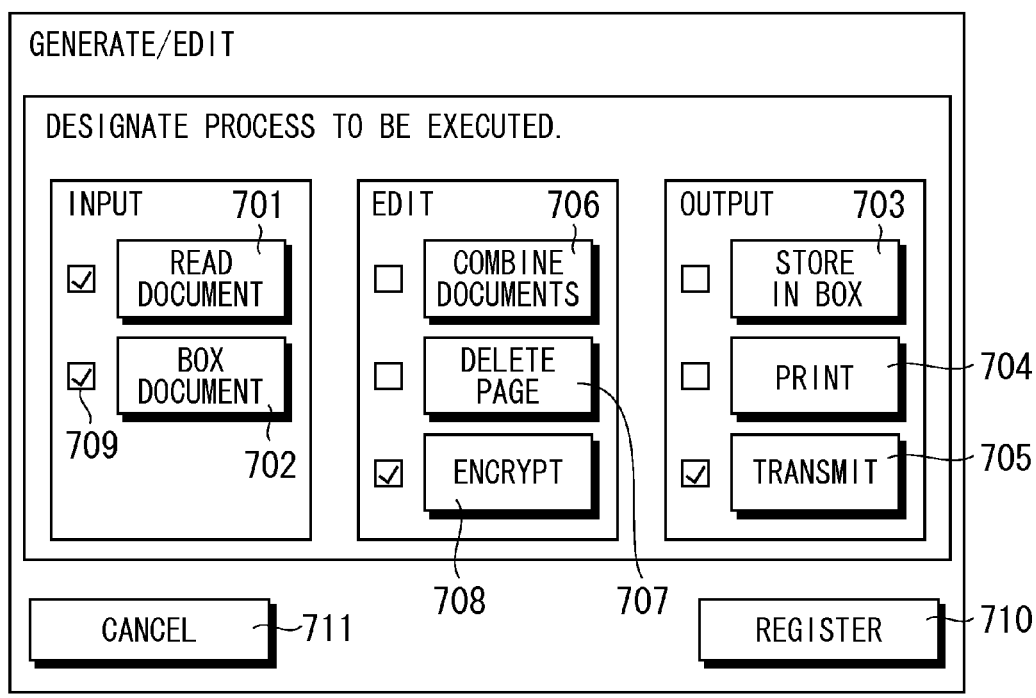
FIG. 7 is shows an example of a process flow generation/editing screen displayed on the operation unit in FIG. 2.

FIG. 7 shows an example of the process flow generation/editing screen displayed on the operation unit in FIG. 2.

The screen displayed in FIG. 7 is the process flow generation/editing screen that is displayed when the process flow "TRANSMIT CONFIDENTIAL DOCUMENT" of the button 602 has been selected and the button 605 has been depressed.

Buttons 701 to 708 (hereinafter, "task setting buttons") represent tasks of "READ DOCUMENT", "BOX DOCUMENT", "STORE IN BOX", "PRINT", "TRANSMIT", "COMBINE DOCUMENTS", "DELETE PAGE" and "ENCRYPT", in the order thereof. These buttons are depressed to switch the screen to detailed setting screens of the respective tasks (the detailed setting screens are omitted in the figure).

When the task is set in the detailed setting screen, a check mark 709 is displayed beside the task setting button. The task with the check mark 709 displayed beside the task setting button is executed as the process flow.

When a button 710 is depressed, a series of tasks attached with the check marks are registered as the process flow. When a button 711 is depressed, the generation or the editing of the process flow is canceled, and the screen returns to the screen of FIG. 6.

FIG. 8 shows an example of the process flow inquiry definition file used in the image forming apparatus of FIG. 2.

The process flow inquiry definition file 800 is generated for inquiring of the process flow application of a higher version about the task or a setting thereof that has not been able to be analyzed in the process flow application when the GENERATE/EDIT button 605 has been depressed.

FIG. 8 shows an example of the process flow inquiry definition file generated when the process flow application Ver 1.0 installed in the image forming apparatus 101 does not support the encryption and an Encrypt tag has not been able to be analyzed.

A tag 801 is a root tag of the process flow inquiry definition file, and includes the IP address of the image forming apparatus 101 that generates the file, as an attribute. The IP address is included as identification information for obtaining a reply from the image forming apparatus that is the inquiry destination (the process flow application of the higher version). As the identification information, the address of the Web Service may be included instead of the IP address.

A tag 802 indicates that a task of "Encrypt" has not been able to be analyzed. A display name of the task that has not been able to be analyzed is entered into an attribute 803. At the time of the inquiry, the attribute 803 is transmitted as a blank field. At the inquiry destination, the display name is described in this part and the file is returned to an inquirer.

A tag 804 indicates a detailed setting of the task that has not been able to be analyzed. Similarly to the tag 802, the tag 804 includes the attribute 803.

Figure 9:
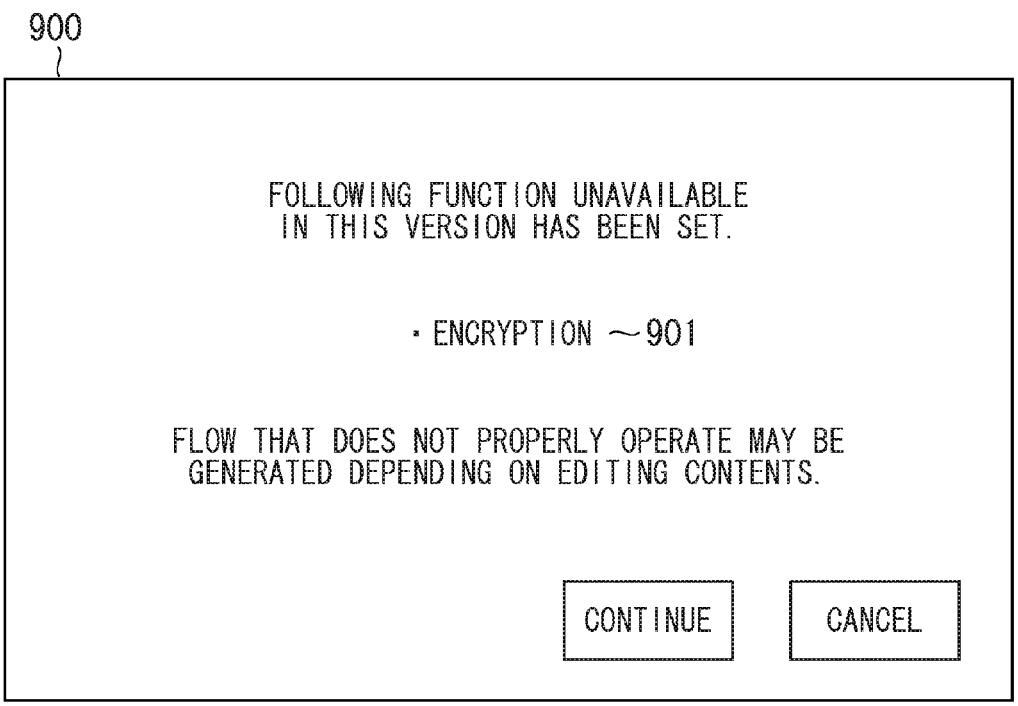
FIG. 9 shows an example of the operation screen (warning screen) that is displayed on the operation unit of FIG. 2 if there has been a task, a setting thereof or the like that has not been able to be analyzed when a GENERATE/EDIT button in FIG. 6 has been depressed.

FIG. 9 shows an example of the operation screen (warning screen) that is displayed on the operation unit 220 of FIG. 2 if there has been the task, the setting thereof or the like that has not been able to be analyzed when the GENERATE/EDIT button 605 in FIG. 6 has been depressed.

In the warning screen, an area 901 displays a message including the display name or the like of the task or the setting obtained as a result of transmitting the process flow inquiry definition file 800 and inquiring of the process flow application of the higher version.

In the present embodiment, a warning screen 900 is displayed so that the user can select between continuation and cancel. However, like a warning screen 1100 of FIG. 11, a check box may be provided along with the display name of the task or the setting, in an area 1101. If the user has unchecked the check box, and continued and saved the editing, the process flow in which the task or the setting is not included is saved.

Figure 12:
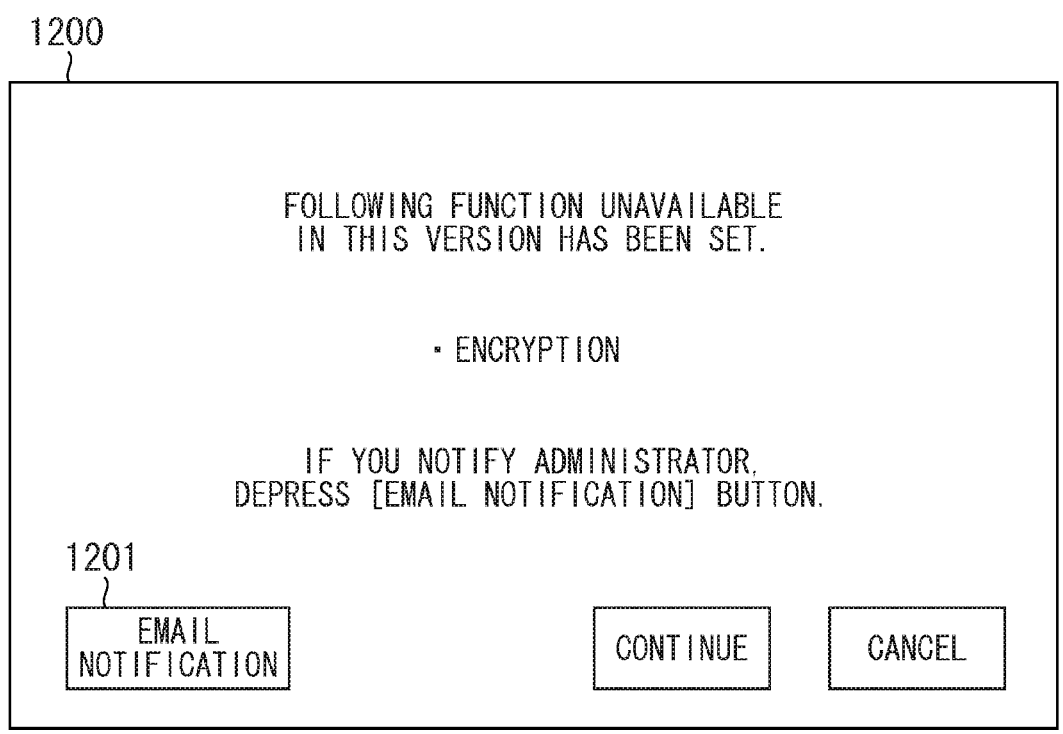
FIG. 12 shows an example of the operation screen (warning screen) that is displayed on the operation unit of FIG. 2 if there has been the task, the setting thereof or the like that has not been able to be analyzed when the GENERATE/EDIT button in FIG. 6 has been depressed.

Moreover, like a warning screen 1200 of FIG. 12, an EMAIL NOTIFICATION button 1201 may be provided so as to enable an administrator to be communicated that there is an unavailable function, via email. The EMAIL NOTIFICATION button 1201 is depressed to notify the administrator who manages the process flow, via email. The warning screen 900 of FIG. 9 may be displayed to automatically notify the administrator via email.

Figure 10:
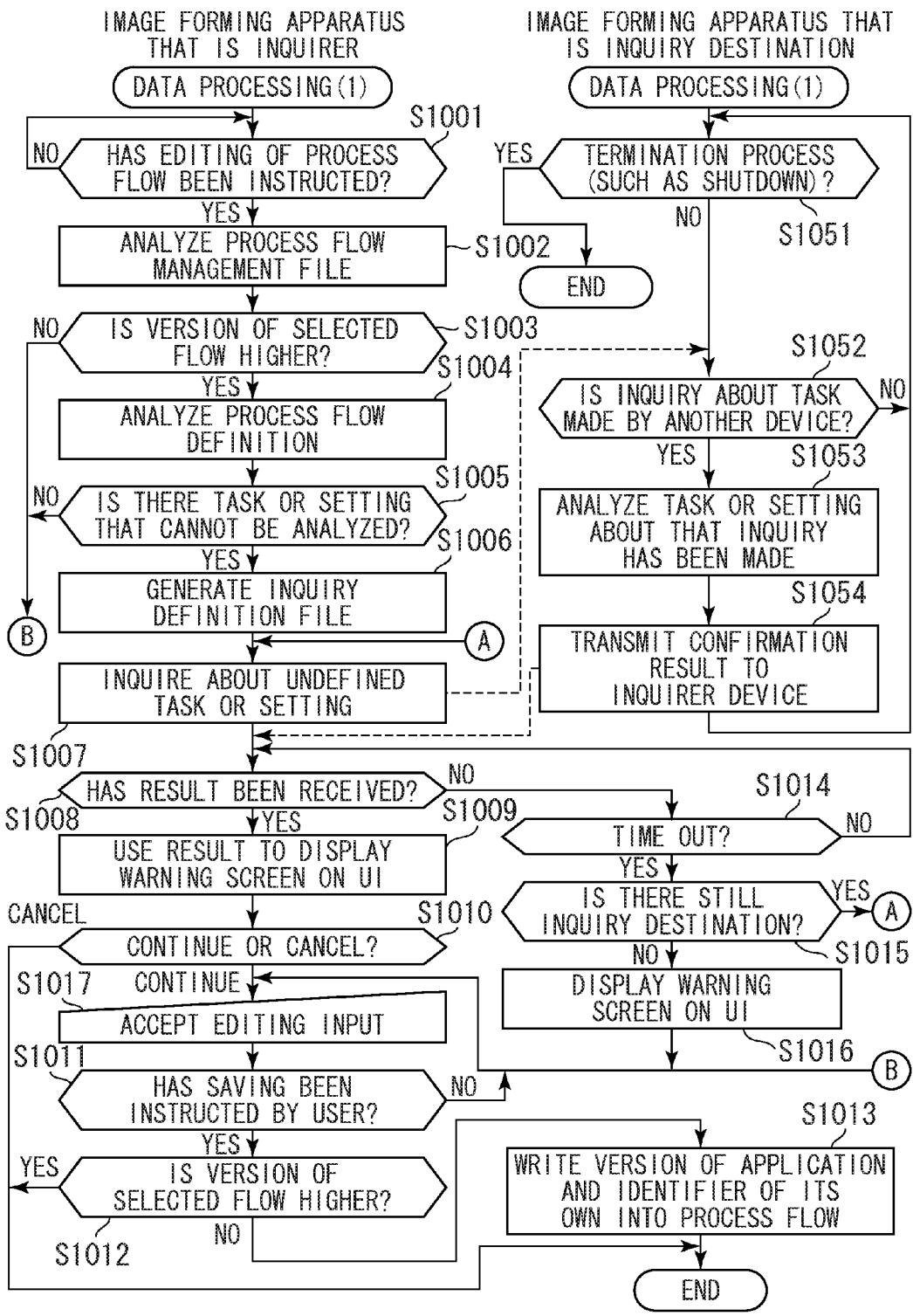
FIG. 10 is a flowchart showing a data processing procedure executed by the software modules of the image forming apparatus (process flow execution apparatus) of FIG. 3 when a process flow is edited.

FIG. 10 is a flowchart showing a data processing procedure executed by the image forming apparatus (process flow execution apparatus) of FIG. 2 when the process flow is edited. The CPU 201 in the image forming apparatus executes at least any of the software modules of FIG. 3, and thereby a process of this flowchart is performed.

Steps S1001 to S1017 are the data processing procedure in the image forming apparatus (inquirer) in which the process flow application of a lower version to which the editing of the process flow has been instructed, has been installed.

Steps S1051 to S1054 are the data processing procedure in the image forming apparatus (inquiry destination) in which the process flow application of the higher version has been installed.

In step S1001, the UI unit 301 monitors whether or not the process flow editing instruction is issued from the user. If the process flow has been selected and the GENERATE/EDIT button 605 has been depressed on the process flow operation screen of FIG. 6, the UI unit 301 determines that the process flow editing instruction has been issued from the user. If the editing instruction has been issued, the process proceeds to step S1002, and if the editing instruction has not been issued, the monitoring is continued.

In step S1002, the flow execution unit 305 receives and analyzes the process flow management file 400 from the flow management unit 306, and the process proceeds to step S1003.

In step S1003, the flow execution unit 305 reads the version of the selected process flow from the column 404 for the version in the process flow management file 400, and determines whether or not this is higher than the version of the process flow application installed in the image forming apparatus (inquirer).

If the version of the selected process flow has been higher (Yes in step S1003), the process proceeds to step S1004. If the version of the selected process flow has been the lower version or the same version (No in step S1003), the process proceeds to step S1017.

In step S1004, the flow execution unit 305 receives and analyzes the process flow definition file 500 from the flow management unit 306, and the process proceeds to step S1005.

In step S1005, as a result of analyzing the process flow definition in step S1004, the flow execution unit 305 determines whether or not there has been the task or the task setting that has not been able to be analyzed. If there has been the task or the task setting that has not been able to be analyzed (Yes in step S1005), the process proceeds to step S1006. If all process flow definitions have been able to be analyzed (No in step S1005), the process proceeds to step S1017.

In step S1006, the flow execution unit 305 generates the process flow inquiry definition file 800 in order to inquire about the task or the task setting that has not been able to be analyzed.

In step S1007, the communication unit 302 receives the process flow inquiry definition file 800, and the inquiry destination in the column 405 in the process flow management file 400, from the flow execution unit 305. Next, the communication unit 302 transmits the process flow inquiry definition file 800 to the inquiry destination received from the flow execution unit 305, and the process proceeds to step S1008.

In step S1008, the communication unit 302 monitors whether or not a result of the inquiry in step S1007 has been received. If the result has been received from the inquiry destination (Yes in step S1008), the process proceeds to step S1009. If the result has not been received (No in step S1008), the process proceeds to step S1014.

In step S1009, the UI unit 301 receives the result from the communication unit 302, and uses the result to display the warning screen 900, and the process proceeds to step S1010. As described above, the warning screen 1100 may be displayed instead of the warning screen 900 to cause the user to remove a task that cannot be executed or a setting thereof. Moreover, the warning screen 1200 may be displayed instead of the warning screen 900 to notify the administrator via email.

In step S1010, the UI unit 301 accepts a continuation or cancel instruction from the user. The instruction from the user is issued by depressing the button on the warning screen 900. If the continuation has been instructed, the process proceeds to step S1017, and the UI unit 301 displays the editing screen of FIG. 7 to accept an editing input, and the process proceeds to step S1011. If the cancel has been instructed, the UI unit 301 displays the operation screen of FIG. 6, and data processing for editing the process flow is terminated.

In step S1011, the UI unit 301 monitors whether or not a saving instruction has been issued from the user. If the saving instruction has been issued from the user (Yes in step S1011), the edited contents are reflected in the process flow definition file 500, the process flow is passed to and saved in the flow management unit 306, and the process proceeds to step S1012. If the saving instruction has not been issued from the user (No in step S1011), the monitoring is continued.

In step S1012, the flow execution unit 305 determines whether the version of the process flow is higher than the version of its own process flow application, based on a result of the determination in step S1003.

If the selected process flow has been the higher version (Yes in step S1012), the flow execution unit 305 terminates the data processing for editing the process flow. If the selected process flow has been the lower or same version (No in step S1012), the process proceeds to step S1013.

In step S1013, the flow execution unit 305 changes the version and the inquiry destination that are described in the column 404 for the version and the column 405 for the inquiry destination in the process flow management file 400. Specifically, if the version of the process flow is lower, the flow execution unit 305 overwrites contents of the columns 404 and 405 with the IP address and the version of the process flow application of its own, and if the version is the same, the flow execution unit 305 adds the IP address of its own to the contents of the column 405. Next, the flow execution unit 305 terminates the data processing for editing the process flow.

If the result has not been received in the above described step S1008 and the process has proceeded to step S1014, the communication unit 302 determines whether a waiting time period has not exceeded a certain time period. If the waiting time period has not exceeded the certain time period, the process returns to step S1008, the monitoring is continued. If the waiting time period has exceeded the certain time period, the process proceeds to step S1015.

In step S1015, the communication unit 302 determines whether or not there is still another inquiry destination received from the flow execution unit 305. If there is another inquiry destination (Yes in step S1015), the process returns to step S1007, and the inquiry is made to a new inquiry destination. If there is not another inquiry destination (No in step S1015), the process proceeds to step S1016.

In step S1016, the UI unit 301 notifies that there is the task or the setting that cannot be analyzed while the task or the setting cannot be displayed, through the display of the warning screen, and the process proceeds to step S1017.

Steps S1051 to S1054 are the data processing procedure in the image forming apparatus (inquiry destination) in which the process flow application of the higher version has been installed.

In step S1051, it is monitored whether a termination process such as shutdown is not performed. If the termination process has been performed, the process is terminated. If the termination process has not been performed, the process proceeds to step S1052.

In step S1052, the communication unit 302 monitors whether or not inquiry about the display name of the task or the task setting is made by another image forming apparatus, that is, whether or not the process flow inquiry definition file 800 has been received. If the inquiry has been made, the process proceeds to step S1053. If the inquiry has not been made, the monitoring is continued.

In step S1053, the flow execution unit 305 receives the process flow inquiry definition file 800 received by the communication unit 302, and analyzes an undefined task or an undefined setting based on the contents thereof. The flow execution unit 305 enters the display name of the task or the task setting that has been analyzed, into a value of the attribute 803 so as to overwrite the process flow inquiry definition file 800, and the process proceeds to step S1054.

In step S1054, the communication unit 302 transmits the overwritten process flow inquiry definition file 800 to the inquirer, the process returns to step S1051, and the monitoring is continued.

Figure 13:
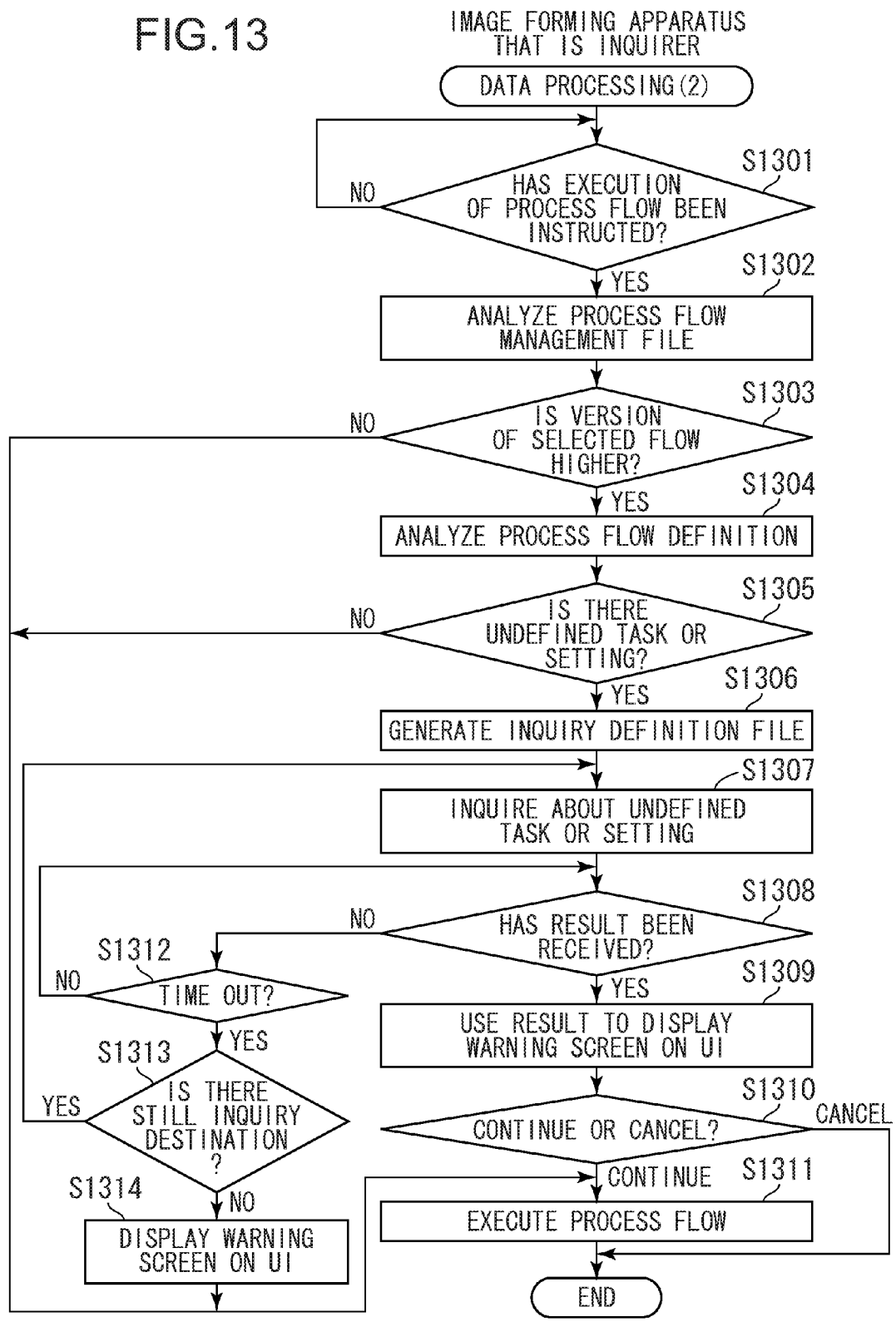
FIG. 13 is a flowchart showing a data processing procedure when the software modules of the image forming apparatus (process flow execution apparatus that is an inquirer) of FIG. 3 instructs to execute.

FIG. 13 is a flowchart showing a data processing procedure executed when the execution has been instructed by the software modules of the image forming apparatus (process flow execution apparatus that is the inquirer) of FIG. 3.

The data processing procedure at the inquiry destination is similar to that of FIG. 10 showing the data processing procedure at the time of the editing, and thus a description thereof is omitted.

In step S1301, the UI unit 301 monitors whether or not a process flow execution instruction is issued from the user. If the user depresses the button (for example, the button 602) for the process flow on the process flow operation screen of FIG. 6, the execution of the process flow is instructed. If the execution instruction has been issued, the process proceeds to step S1302, and if the execution instruction has not been issued, the UI unit 301 continues the monitoring.

In step S1302, the flow execution unit 305 receives and analyzes the process flow management file 400 from the flow management unit 306, and the process proceeds to step S1303.

In step S1303, the flow execution unit 305 reads the version of the process flow for which the execution has been instructed, from the column 404 for the version in the process flow management file 400, and determines whether or not this is higher than the version of the process flow application in the image forming apparatus (process flow execution apparatus that is the inquirer).

If the version of the selected process flow has been higher (Yes in step S1303), a start of the execution of the process flow is suspended, and the process proceeds to step S1304. If the selected process flow has been the lower or same version (No in step S1303), the process proceeds to step S1311.

In step S1304, the flow execution unit 305 receives the process flow definition file 500 from the flow management unit 306, and analyzes this, and the process proceeds to step S1305.

In step S1305, as a result of analyzing the process flow definition in step S1304, the flow execution unit 305 determines whether or not there has been the undefined task or the undefined task setting that has not been able to be analyzed. If there has been the task or the task setting that has not been able to be analyzed (Yes in step S1305), the process proceeds to step S1306. If all process flow definitions have been able to be analyzed (No in step S1305), the process proceeds to step S1311.

In step S1306, the flow execution unit 305 generates the process flow inquiry definition file 800 in order to inquire about the task or the task setting that has not been able to be analyzed.

In step S1307, the communication unit 302 receives the process flow inquiry definition file 800, and the inquiry destination in the column 405 in the process flow management file 400, from the flow execution unit 305. The communication unit 302 transmits the process flow inquiry definition file 800 to the inquiry destination received from the flow execution unit 305, and the process proceeds to step S1308.

In step S1308, the communication unit 302 monitors whether or not a result of the inquiry in step S1307 has been received. If the result has been received from the inquiry destination (Yes in step S1308), the process proceeds to step S1309. If the result has not been received (No in step S1308), the process proceeds to step S1312.

In step S1309, the UI unit 301 receives the result from the communication unit 302, and uses the result to display the warning screen 900, and the process proceeds to step S1310. The warning screen 1100 may be displayed instead of the warning screen 900 to cause the user to remove the task that cannot be executed or the setting thereof. Moreover, the warning screen 1200 may be displayed instead of the warning screen 900 to notify the administrator via email.

In step S1310, the UI unit 301 accepts the continuation or cancel instruction from the user. The instruction from the user is issued by depressing the button on the warning screen 900. If the continuation has been instructed, the process proceeds to step S1311. If the cancel has been instructed, the UI unit 301 displays the operation screen of FIG. 6, and data processing for executing the process flow is terminated.

In step S1311, the flow execution unit 305 passes the process flow that has been divided into the respective tasks, to the task execution unit 307, and the process flow is executed.

If the result has not been received in the above described step S1308 and the process has proceeded to step S1312, the communication unit 302 determines whether the waiting time period has not exceeded the certain time period. If the waiting time period has not exceeded the certain time period, the process returns to step S1308, the monitoring is continued. If the waiting time period has exceeded the certain time period, the process proceeds to step S1313.

In step S1313, the communication unit 302 determines whether or not there is still another inquiry destination received from the flow execution unit. If there is another inquiry destination (Yes in step S1313), the process returns to step S1307, and the inquiry is made to the new inquiry destination. If there is not another inquiry destination (No in step S1313), the process proceeds to step S1314.

In step S1314, the UI unit 301 notifies that there is the task or the setting that cannot be analyzed while the task or the setting cannot be displayed, through the display of the warning screen, and the process proceeds to step S1311.

As above, according to the above described embodiment, when the process flow is edited or executed, the task or the task setting that can be analyzed only by the process flow application of the higher version can be displayed on the process flow application of the lower version.

Consequently, the user can be prevented from editing or executing the process flow without knowing the task or the task setting that cannot be executed, and a result that is not intended by the user can be prevented.

In the above described embodiment, the process flow is analyzed, and each time, the inquiry about the task or the setting thereof that has not been able to be analyzed is made to the image forming apparatus in which the higher version has been installed.

Hereinafter, there is shown an embodiment including a mechanism that stores the result of the inquiry about the task or the setting thereof that has been made once, so as not to make the inquiry again.

Figure 14:
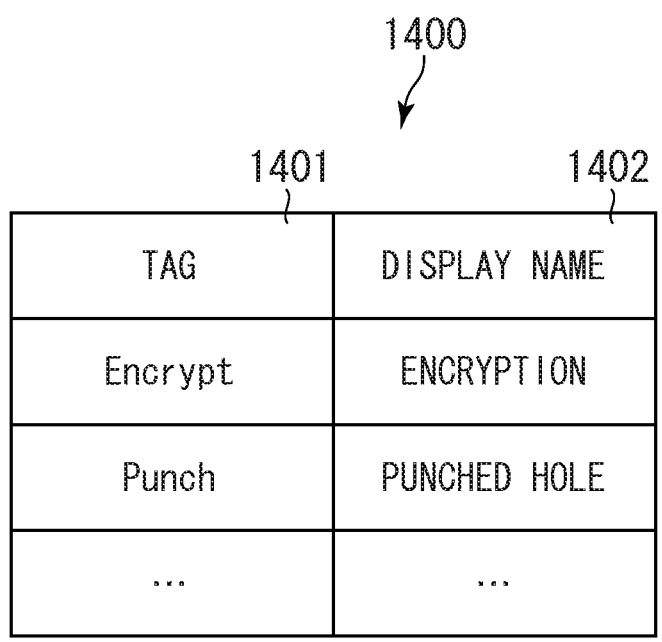
FIG. 14 shows an example of an inquiry result file managed by a process flow management unit in FIG. 3.

FIG. 14 shows an example of an inquiry result file managed by the process flow management unit in FIG. 3. In the present embodiment, while the inquiry result file is managed in the table format, the inquiry result file may be a file in the CSV format or the XML format.

A column 1401 indicates a tag name of the task or the setting thereof that cannot be analyzed and about which the inquiry has been made once. A column 1402 indicates the display name obtained as a result of making the inquiry once.

Figure 15:
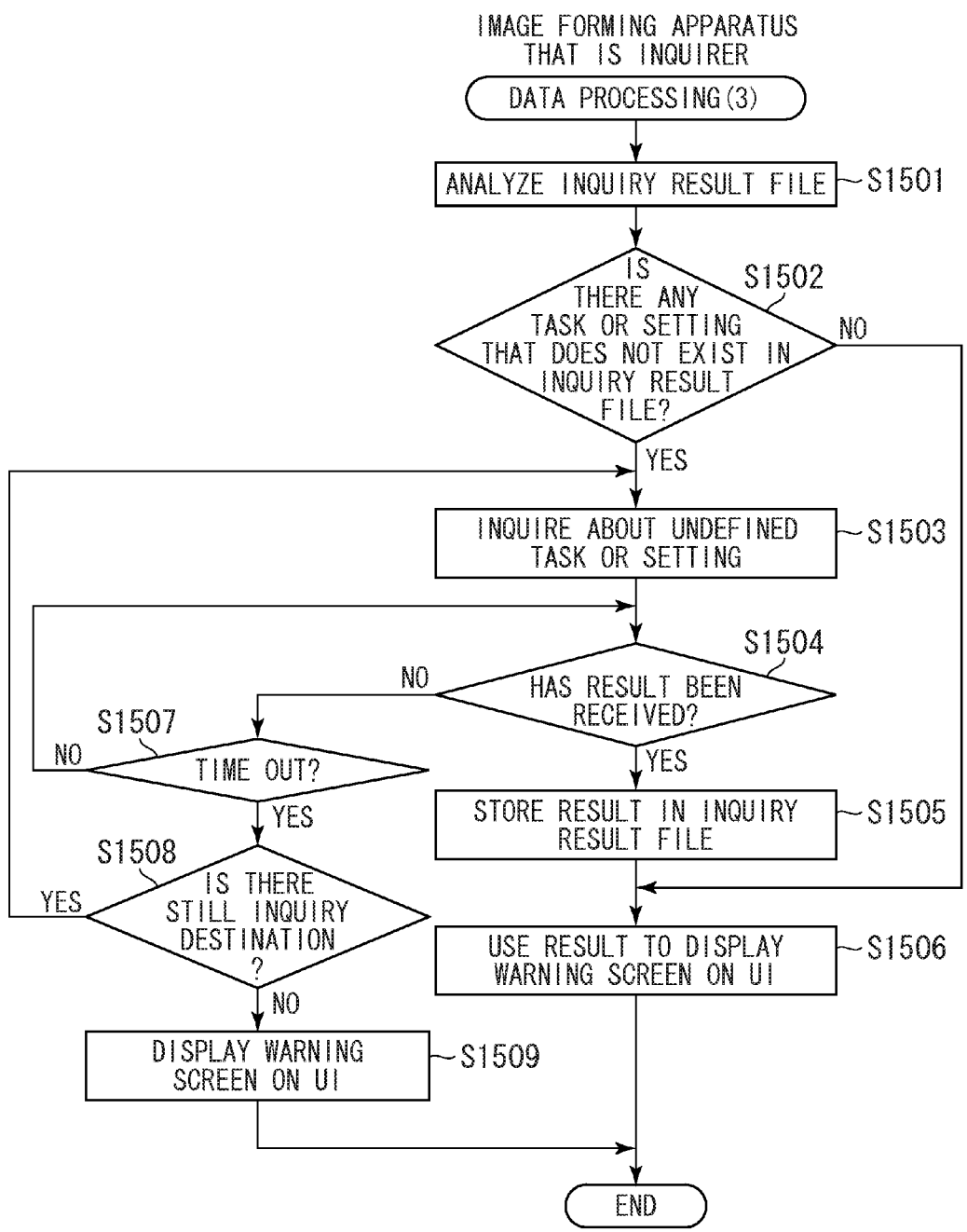
FIG. 15 is a flowchart showing a data processing procedure to display the warning screen on a UI executed by the software modules of the image forming apparatus (process flow execution apparatus) of FIG. 3 when the analysis of the process flow results in the impossible analysis of the task or the setting.

FIG. 15 is a flowchart showing a data processing procedure to display the warning screen on a UI executed by the software modules of the image forming apparatus (process flow execution apparatus) when the analysis of the process flow results in the impossible analysis of the task or the setting.

The data processing procedure at the inquiry destination is similar to the process of FIG. 10, and thus a description thereof is omitted.

In step S1501, the flow execution unit 305 receives an inquiry result file 1400 from the flow management unit 306. The flow execution unit 305 searches whether or not the display name of the task or the setting thereof that has not been able to be analyzed has been described in the inquiry result file 1400, and the process proceeds to step S1502.

In step S1502, the flow execution unit 305 determines whether or not all display names of tasks or settings thereof that have not been able to be analyzed have been described in the inquiry result file 1400. If all display names have been described (No in step S1502), the process proceeds to step S1506. If even one task or the setting thereof of which the display name has not been described in the inquiry result file 1400 has been found (Yes in step S1502), the flow execution unit 305 generates the process flow inquiry definition file 800 with the task or the setting thereof of which the display name has not been found, and the process proceeds to step S1503.

In step S1503, the communication unit 302 receives the process flow inquiry definition file 800, and the inquiry destination in the column 405, from the flow execution unit 305. The communication unit 302 transmits the process flow inquiry definition file 800 to the inquiry destination received from the flow execution unit 305, and the process proceeds to step S1504.

In step S1504, the communication unit 302 monitors whether or not a result of the inquiry in step S1503 has been received. If the result has been received from the inquiry destination (Yes in step S1504), the process proceeds to step S1505. If the result has not been received (No in step S1504), the process proceeds to step S1507.

In step S1505, the flow execution unit 305 adds the result obtained in step S1504 to the inquiry result file 1400. Next, the flow execution unit 305 passes the result to the flow management unit 306 to save the result therein, and the process proceeds to step S1506.

In step S1506, the UI unit 301 receives the result from the communication unit 302, and uses the result to display the warning screen 900. If the user has instructed to edit the process flow, an operation after the display is the same as the procedure from step S1010 of the data processing procedure of FIG. 10. If the user has instructed to execute the process flow, the operation after the display is the same as the procedure from step S1310 of the data processing procedure of FIG. 13. Thus a description of the operation after the display is omitted.

If the result has not been received in the above described step S1504 and the process has proceeded to step S1507, the communication unit 302 determines whether the waiting time period has not exceeded the certain time period. If the waiting time period has not exceeded the certain time period, the process returns to step S1504, the monitoring is continued. If the waiting time period has exceeded the certain time period, the process proceeds to step S1508.

In step S1508, the communication unit 302 determines whether or not there is still another inquiry destination received from the flow execution unit 305. If there is another inquiry destination (Yes in step S1508), the process returns to step S1503, and the inquiry is made to the new inquiry destination. If there is not another inquiry destination (No in step S1508), the process proceeds to step S1509.

In step S1509, the UI unit 301 notifies that there is the task or the setting that cannot be analyzed while the task or the setting cannot be displayed, through the display of the warning screen, and the process is terminated.

As above, according to the present embodiment, when the process flow is edited or executed, the task or the task setting that can be analyzed only by the process flow application of the higher version can be displayed on the process flow application of the lower version.

Consequently, the user can be prevented from performing the editing or the execution without knowing the task or the task setting that cannot be executed, and the result that is not intended by the user can be prevented.

Furthermore, the inquiry is not made twice about the task or the task setting about which the inquiry has been made once. Therefore, the number of communications can be reduced and a time required for the communications can also be reduced.

OTHER EMBODIMENTS

As described above, although various embodiments have been described in detail, the present invention may either be applied to a system composed of a plurality of apparatuses or to a single apparatus. For example, the present invention may be applied to a scanner, a printer, a PC, a duplicating machine, a Multiple Function Peripheral, and a facsimile machine.

The present invention may also be accomplished by directly or remotely supplying a system or an apparatus with a control program that realizes the functions of the above described embodiments, and causing a computer included in the system or the like to read out and execute the supplied program code.

Therefore, the program code itself of the control program that is installed in the computer or the above described apparatus in order to realize the functions and the processes of the present invention in the computer or the above described apparatus also realizes the present invention. In other words, the control program itself that realizes the above described functions and processes is also one of the present invention.

In that case, if functions of the program are included, the form of the program may be an object code, a program code executed by an interpreter, or script data supplied to an OS.

Examples of a storage medium for supplying the program include a flexible disk, a hard disk, an optical disk, a magnetic-optical disk, an MO, a CD-ROM, a CD-R, and a CD-RW. Moreover, the examples of the storage medium also include a magnetic tape, a nonvolatile memory card, a ROM and a DVD (a DVD-ROM, a DVD-R).

Moreover, the program may be downloaded from a website on the Internet/intranet by using a browser of a client computer. In other words, a computer program itself of the present invention, or a file that has been compressed and includes an automatic installation function, may be downloaded from the website into the recording medium such as the hard disk. Moreover, the present invention may also be realized by dividing the program code constituting the program of the present invention into a plurality of files and downloading the respective files from different websites. In other words, a WWW server that causes a plurality of users to download a program file that realizes the functions and the processes of the present invention in the computer may also be a constituent feature of the present invention.

Moreover, the program of the present invention may be encrypted, stored in a storage medium such as the CD-ROM, and distributed to the user. In this case, only the user who has satisfied a predetermined condition may be caused to download key information with which decryption is performed, from a website via the Internet/intranet, decode the encrypted program with the key information, execute the program, and install the program in the computer.

Moreover, it is understood that the functions of the embodiments described above may be realized not necessarily by causing the computer to read and execute the program code, but alternatively by causing an operating (OS) system running on the computer to perform part or all of the actual processing based on instructions in the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-103786, filed on Apr. 11, 2008 that is hereby incorporated by reference herein in its entirety.

What is claimed is:

1. A process flow execution apparatus in which a first process flow application is installed, and that is adapted to communicate, via a network, with an external apparatus in which a second process flow application is installed, the process flow execution apparatus comprising:
   an acceptance unit adapted to accept a process flow from the external apparatus, the process flow generated by the second process flow application, the process flow describing process contents of a plurality of tasks including an image inputting task and an image outputting task, and the acceptance unit adapted to accept an instruction for the process flow execution apparatus to execute the plurality of tasks based on the process flow; and
   a control unit adapted, in response to accepting the instruction, but before the process flow execution apparatus executes the plurality of tasks based on the process flow, to:
   determine whether or not a version of the second process flow application installed in the external apparatus that generated the process flow is higher than a version of the first process flow application installed in said process flow execution apparatus, and
   control to display a warning screen on a display unit if it is determined by the control unit that the version of the second process flow application installed in the external apparatus that generated the process flow is higher than the version of the first process flow application installed in said process flow execution apparatus,
   wherein the process flow execution apparatus further comprises an inquiry unit adapted to, if the version of the second process flow application installed in the external apparatus that generated the process flow is higher than the version of the first process flow application installed in said process flow execution apparatus, inquire of another apparatus connected via said network, about process contents of said process flow that cannot be executed in the first process flow application installed in said process flow execution apparatus, and
   wherein said control unit is adapted to cause information indicating process contents received from said another apparatus, to be displayed on said display unit, in response to the inquiry from said inquiry unit.

2. The process flow execution apparatus according to claim 1, wherein said control unit is adapted to, if the version of the second process flow application installed in the external apparatus that generated the process flow is higher than the version of the first process flow application installed in said process flow execution apparatus, suspend a start of the execution at the process flow execution apparatus of the plurality of tasks based on said process flow, and control to display a message prompting to select whether or not to execute said process flow, in said warning screen.

3. The process flow execution apparatus according to claim 1, wherein contents described in said process flow include information specifying an apparatus that has edited said process flow, and said inquiry unit is adapted to inquire of said another apparatus based on the information specifying the apparatus that has edited said process flow.

4. The process flow execution apparatus according to claim 1, wherein contents described in said process flow include information indicating a version of a process flow application that has edited said process flow.

5. The process flow execution apparatus according to claim 1, further comprising
   an editing unit adapted to edit the process flow,
   wherein contents described in said process flow include process flow information indicating a version of a process flow application that has edited said process flow, and an identifier that specifies an apparatus that has edited said process flow,
   wherein said editing unit is adapted to, if the version described in said process flow information is lower than a version of the first process flow application installed in said process flow execution apparatus, overwrite said process flow with the version of said first process flow application and the identifier with a new identifier that specifies said process flow execution apparatus.

6. The process flow execution apparatus according to claim 5, further comprising a saving unit adapted to save said process flow,
   wherein said control unit is adapted to perform display on the display unit prompting a user to select an action among an action to save said process flow in said saving unit after deletion of a description regarding the process contents that are obtained from a result of said inquiry and cannot be executed, and an action to directly save said process flow without deletion.

7. The process flow execution apparatus according to claim 5, wherein said control unit is adapted to perform display on the display unit prompting a user to select whether or not to notify an administrator of the process contents that are obtained from a result of said inquiry and cannot be executed.

8. The process flow execution apparatus according to claim 3, further comprising a saving unit adapted to save said process flow, and an analyzing unit adapted to analyze the process flow,
wherein said analyzing unit is adapted to determine whether or not the process contents of said process flow that cannot be executed by said process flow application have already been saved in said saving unit, and if said analyzing unit has determined that the process contents have not been saved, said analyzing unit is adapted to inquire from the apparatus specified by said identifier, and if said analyzing unit has determined that the process contents have been saved, said analyzing unit is adapted to notify a user of the process contents saved in said saving unit without inquiring.

9. The process flow execution apparatus according to claim 1, wherein the version of the first process flow application or the version of the second process flow application is associated with all of the plurality of tasks.

10. The process flow execution apparatus according to claim 1, wherein the control unit is adapted to identify which of a plurality of external apparatuses that has generated or edited the process flow has a highest process flow application version in association with the control unit determining whether or not the version of the second process flow application installed in the external apparatus that generated the process flow is higher than the version of the first process flow application installed in said process flow execution apparatus.

11. A control method for a process flow execution apparatus in which a first process flow application is installed, and that is adapted to communicate, via a network, with an external apparatus in which a second process flow application is installed, said control method comprising:
an acceptance step, executed by an acceptance unit of the process flow execution apparatus, of accepting a process flow from the external apparatus, the process flow generated by the second process flow application, the process flow describing process contents of a plurality of tasks including an image inputting task and an image outputting task, and the acceptance step including accepting an instruction for the process flow execution apparatus to execute the plurality of tasks based on the process flow; and
a control step, executed by a control unit of the process flow execution apparatus of, in response to accepting the instruction, but before the process flow execution apparatus executes the plurality of tasks based on the process flow:
determining whether or not a version of the second process flow application installed in the external apparatus that generated the process flow is higher than a version of the first process flow application installed in said process flow execution apparatus, and
controlling to display a warning screen on a display unit if it is determined by the control unit that the version of the second process flow application installed in the external apparatus that generated the process flow is higher than the version of the first process flow application installed in said process flow execution apparatus,
wherein the method further comprises an inquiry step, executed by an inquiry unit of the process flow execution apparatus, of, if the version of the second process flow application installed in the external apparatus that generated the process flow is higher than the version of the first process flow application installed in said process flow execution apparatus, inquire of another apparatus connected via said network, about process contents of said process flow that cannot be executed in the first process flow application installed in said process flow execution apparatus, and
wherein said control step includes causing information indicating process contents received from said another apparatus, to be displayed on said display unit, in response to the inquiry from said inquiry step.

12. A non-transitory computer-readable storage medium storing a computer-executable control program for execution by a process flow execution apparatus in which a first process flow application is installed, the process flow apparatus adapted to communicate, via a network, with an external apparatus in which a second process flow application is installed, said control program comprising:
acceptance instructions configured to accept a process flow from the external apparatus, the process flow generated by the second process flow application, the process flow describing process contents of a plurality of tasks including an image inputting task and an image outputting task, and the acceptance instructions configured to accept an instruction for the process flow execution apparatus to execute the plurality of tasks based on the process flow; and
control instructions configured, in response to accepting the instruction, but before the process flow execution apparatus executes the plurality of tasks based on the process flow:
determine whether or not a version of the second process flow application installed in the external apparatus that generated the process flow is higher than a version of the first process flow application installed in said process flow execution apparatus, and
control to display a warning screen on a display unit if it is determined according to the control instructions that the version of the second process flow application installed in the external apparatus that generated the process flow is higher than the version of the first process flow application installed in said process flow execution apparatus,
wherein the program further comprises inquiry instructions configured to, if the version of the second process flow application installed in the external apparatus that generated the process flow is higher than the version of the first process flow application installed in said process flow execution apparatus, inquire of another apparatus connected via said network, about process contents of said process flow that cannot be executed in the first process flow application installed in said process flow execution apparatus, and
wherein said control instructions are configured to cause information indicating process contents received from said another apparatus, to be displayed on said display unit, in response to the inquiry from said inquiry instructions.

* * * * *